US006957640B1

(12) United States Patent
Liu et al.

(10) Patent No.: US 6,957,640 B1
(45) Date of Patent: Oct. 25, 2005

(54) STRATEGY FOR FUELING A DIESEL ENGINE BY SELECTIVE USE OF FUELING MAPS TO PROVIDE HCCI+RVT, HCCI+VVT, AND CD+RVT COMBUSTION MODES

(75) Inventors: Zhengbai Liu, Naperville, IL (US); Puning Wei, Naperville, IL (US); Dennis Kelly Sullivan, Elmhurst, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 73 days.

(21) Appl. No.: 10/874,668

(22) Filed: Jun. 23, 2004

(51) Int. Cl.$^7$ ............................................. F02B 5/00
(52) U.S. Cl. ........................................ 123/305; 123/299
(58) Field of Search ............................. 123/299, 300, 123/301, 305, 295, 436, 681

(56) References Cited

U.S. PATENT DOCUMENTS

| 5,785,031 | A | | 7/1998 | Akimoto et al. | |
|---|---|---|---|---|---|
| 5,832,880 | A | | 11/1998 | Dickey | |
| 5,875,743 | A | | 3/1999 | Dickey | |
| 5,881,693 | A | | 3/1999 | Mizuno | |
| 5,896,840 | A | | 4/1999 | Takahashi | |
| 5,937,822 | A | | 8/1999 | Nakajima | |
| 6,079,387 | A | * | 6/2000 | Mamiya et al. ............. | 123/295 |
| 6,209,516 | B1 | * | 4/2001 | Yamashita ................... | 123/305 |
| 6,390,054 | B1 | * | 5/2002 | Yang .......................... | 123/295 |
| 6,390,055 | B1 | * | 5/2002 | Sivashankar et al. ....... | 123/295 |
| 6,561,157 | B2 | * | 5/2003 | zur Loye et al. ............ | 123/295 |

OTHER PUBLICATIONS

C. Vafidis, "The Application Of An Electro-Hydraulic VVA System On A Passenger Car C.R. Diesel Engine, " Paper 20A2011, ATA Congress on The Future of Diesel Engine Technology for Passenger Cars, Porto Cervo, Italy, Oct. 12-13, 2000.

P. Wolters, W. Salber, J. Geiger, M. Duesmann and J. Dilthey, "Controlled Auto Ignition Combustion Process with an Electromechanical Valve Train," Paper 2003-01-0032, SAE International, 2003 SAE World Congress, Detroit, Michigan, Mar. 3-6, 2003.

* cited by examiner

*Primary Examiner*—Mahmoud Gimie
(74) *Attorney, Agent, or Firm*—Dennis Kelly Sullivan; Susan L. Lukasik; Jeffrey P. Calfa

(57) ABSTRACT

A compression ignition engine (60) has a control system (66) for processing data, one or more combustion chambers (62), and fuel injectors (64) for injecting fuel into the chambers. The control system controls fueling using a result of the processing of certain data, such as engine speed and engine load, to select one of three fueling modes (HCCI+RVT, HCCI+VVT, CD+RVT) for operating the engine. When the result of the processing selects the HCCI+RVT mode, intake valves operate with regular valve timing (RVT), and the engine is fueled to cause homogeneous-charge compression-ignition (HCCI) combustion. When the result of the processing selects the HCCI+VVT mode, intake valve timing is changed relative to RVT, and the engine is fueled to cause HCCI combustion. When the result of the processing selects the CD+RVT mode, the intake valves operate with RVT, and the engine is fueled to cause CD combustion.

20 Claims, 3 Drawing Sheets

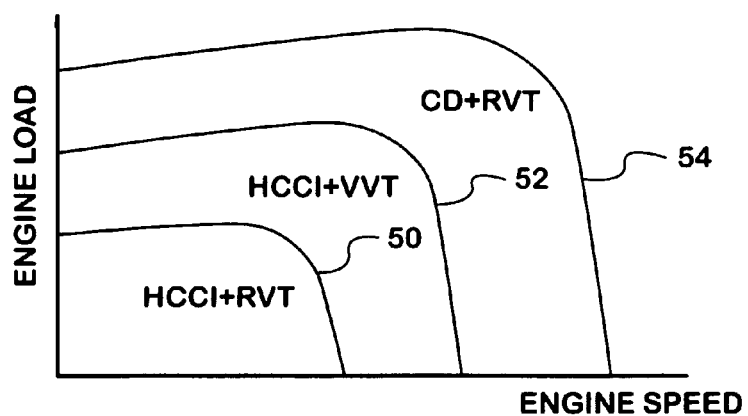
FIG. 1
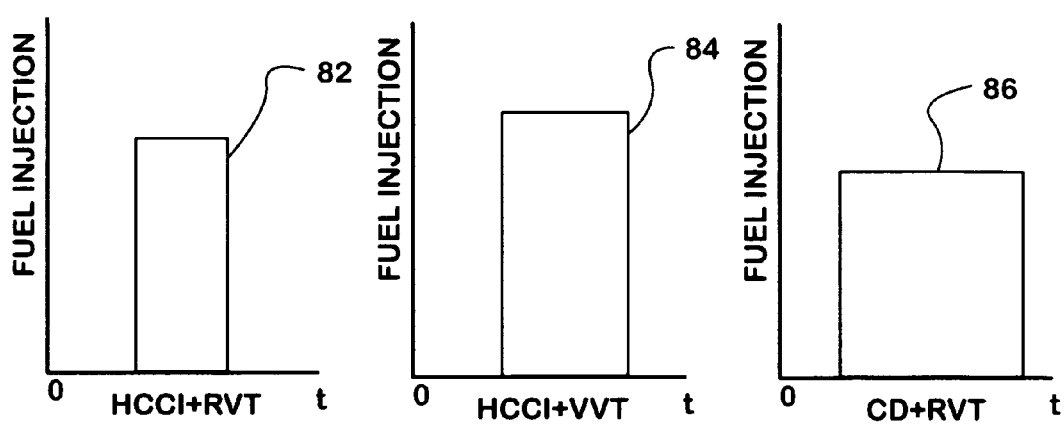
FIG. 4A          FIG. 4B          FIG. 4C

STRATEGY FOR FUELING A DIESEL ENGINE BY SELECTIVE USE OF FUELING MAPS TO PROVIDE HCCI+RVT, HCCI+VVT, AND CD+RVT COMBUSTION MODES

FIELD OF THE INVENTION

This invention relates generally to internal combustion engines. More specifically it relates to a control strategy for selectively utilizing homogeneous-charge compression-ignition (HCCI) in a way that takes advantage of HCCI's attributes in different ways during different modes of operation of an engine that has variable valve timing. More specifically the invention relates to a strategy for fueling the engine to cause HCCI combustion during a first mode (HCCI+RVT), to cause HCCI combustion during a second mode (HCCI+VVT) where variable valve timing causes intake valves to close at different delayed times during the engine cycle than during the first mode, and CD (conventional diesel) combustion during a third mode (CD+RVT).

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_x$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by many scientists and engineers in the engine research and design community.

One aspect of HCCI seems to impose a limit on the extent to which it can provide drastically reduced tailpipe emissions of soot and $NO_x$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion upon being injected into charge air that has been compressed within a cylinder to a pressure that is sufficiently great to cause the fuel to combust as it is being injected.

With the advent of processor-controlled fuel injection systems capable of controlling fuel injection with precision that allows fuel to be injected at different injection pressures, at different times, and for different durations during an engine cycle over the full range of engine operation, a diesel engine becomes capable of both CD combustion and HCCI combustion.

As will be explained by later description, the present invention takes advantage of the capabilities of those fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

Pending U.S. patent application Ser. No. 10/809,254 discloses a diesel engine and associated processor-controlled fuel injection system that processes certain data to select one of plural fueling modes for operating the engine. When a result of the processing selects a first fueling mode (HCCI mode), the engine is fueled during an engine cycle to create a substantially homogeneous air-fuel charge within one or more combustion chambers. That charge is compressed to combust by auto-ignition, with no more fuel being introduced after auto-ignition. When a result of the processing selects a second fueling mode (HCCI-CD mode), the engine is fueled during an engine cycle to create a substantially homogeneous air-fuel charge within the one or more combustion chambers. That charge is compressed to combust by auto-ignition (HCCI), after which more fuel is introduced into the one or more combustion chambers to provide additional combustion (CD). That engine utilizes HCCI combustion at relatively smaller loads and relatively smaller speeds and what is referred to as HCCI-CD combustion at relatively larger loads and relatively higher speeds. The present invention relates to an engine, system, and method for enhancing the use of HCCI combustion in a diesel engine toward objectives that include reducing the generation of undesired constituents in engine exhaust, especially soot and $NO_x$, and improving thermal efficiency. The invention is embodied in the fuel injection control strategy, a strategy that is programmed in an associated processing system.

According to principles of the present invention, the utilization of HCCI combustion occurs in a different manner from that described in U.S. patent application Ser. No. 10/809,254. The present invention comprises three distinct modes of engine operation: 1) an HCCI+RVT mode; 2) an HCCI+VVT mode; and 3) a CD+RVT mode. Each of these modes will be explained in detail hereinafter. The HCCI+RVT mode is utilized at relatively smaller loads and relatively lower speeds. The HCCI+VVT mode is utilized at relatively larger loads than those of the HCCI+RVT mode and at relatively higher speeds than those of the HCCI+RVT mode. The CD+RVT mode is utilized at still relatively larger loads than those of the HCCI+VVT mode and at still relatively higher speeds than those of the HCCI+VVT mode.

The HCCI+VVT mode enables the benefits of HCCI to be obtained in a portion of the engine operating range between the portion of the range where HCCI+RVT is exclusively used and the portion of the range where CD+RVT is exclusively used.

One generic aspect of the present invention relates to a method of operating a compression ignition engine. Certain data is processed by an engine control system to select one of plural fueling modes for operating the engine.

When the result of the processing selects a first fueling mode (HCCI+RVT), one or more combustion chambers are fueled to create, within each such combustion chamber during a corresponding engine cycle, a substantially homogeneous air-fuel charge that is compressed to auto-ignition without the introduction of any additional fuel after auto-ignition during that corresponding engine cycle.

When the result of the processing selects a second fueling mode (HCCI+VVT), the effective compression ratio for each such combustion chamber is reduced from the effective compression ratio used during the first fueling mode (HCCI+RVT), and each such combustion chamber is fueled to create a substantially homogeneous air-fuel charge that is compressed to auto-ignition without the introduction of any additional fuel after auto-ignition during that corresponding engine cycle.

When the result of the processing selects a third fueling mode (CD+RVT), each such combustion chamber is fueled by introducing fuel at a time during the engine cycle when air in the corresponding combustion chamber has been compressed sufficiently to cause the fuel to combust as it is being introduced.

Another generic aspect of the invention relates to a compression ignition engine that operates according to the method just described.

Still another generic aspect of the invention relates to a compression ignition engine comprising a control system for processing data, one or more combustion chambers, and a fueling system for injecting fuel into the one or more combustion chambers.

The control system controls the fueling system to extend the load/speed range over which HCCI combustion occurs by a) fueling one or more combustion chambers over a relatively lower speed/load range to create a substantially homogeneous air-fuel charge within each such combustion chamber during a corresponding engine cycle and compressing each charge to auto-ignition without introducing any additional fuel after auto-ignition during that corresponding engine cycle, and b) decreasing the effective compression ratio of each such combustion chamber and fueling each such combustion chamber with increased fueling over a relatively higher speed/load range to create a substantially homogeneous air-fuel charge within each such combustion chamber during a corresponding engine cycle and compressing each charge to auto-ignition without introducing any additional fuel after auto-ignition during that corresponding engine cycle.

Another generic aspect relates to a compression ignition engine that operates according to the method just described.

In disclosed embodiment of the invention, the data that is processed to select the particular mode comprises engine speed data and engine load data. Injection pressure, duration, and timing may differ from mode to mode. Data for the various modes are contained in maps in the engine control system.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1 is a representative graphic portrayal of fueling strategy in accordance with principles of the present invention comprising an HCCI+RVT combustion mode for some speed-load conditions, an HCCI+VVT combustion mode for other speed-load conditions, and a CD+RVT combustion mode for still other speed-load conditions.

FIG. 4A illustrates a generic fuel injection according to a generic fueling map used for HCCI+RVT combustion.

FIG. 4B illustrates a generic fuel injection according to a generic fueling map used for HCCI+VVT combustion.

FIG. 4C illustrates a generic fuel injection according to a generic fueling map used for CD+RVT combustion.

DESCRIPTION OF THE PREFERRED EMBODIMENT

FIG. 1 is a graph whose vertical axis represents engine load and whose horizontal axis represents engine speed. At the origin of the graph, engine load is zero, and engine speed is zero. Respective solid lines 50, 52, and 54 demarcate three zones labeled HCCI+RVT, HCCI+VVT, and CD+RVT. RVT stands for regular valve timing of the engine intake valves, and VVT, variable valve timing of the engine intake valves.

Zone HCCI+RVT covers an area that encompasses various combinations of relatively smaller engine loads and relatively lower engine speeds. Zone HCCI+VVT covers an area that encompasses various combinations of relatively larger engine loads and relatively higher engine speeds than those of zone HCCI+RVT. Zone CD+RVT covers an area that encompasses various combinations of still relatively larger engine loads and still relatively higher engine speeds than those of zone HCCI+VVT. When a compression ignition engine is operating at a speed and load that falls within Zone HCCI+RVT, fuel is injected into the engine cylinders in a manner that creates HCCI combustion. When the engine is operating at a speed and load that falls within Zone HCCI+VVT, fuel is injected into the cylinders in a manner that creates HCCI combustion. When the engine is operating at a speed and load that falls within Zone CD+RVT, fuel is injected into the cylinders in a manner that creates CD combustion.

Figure 2:
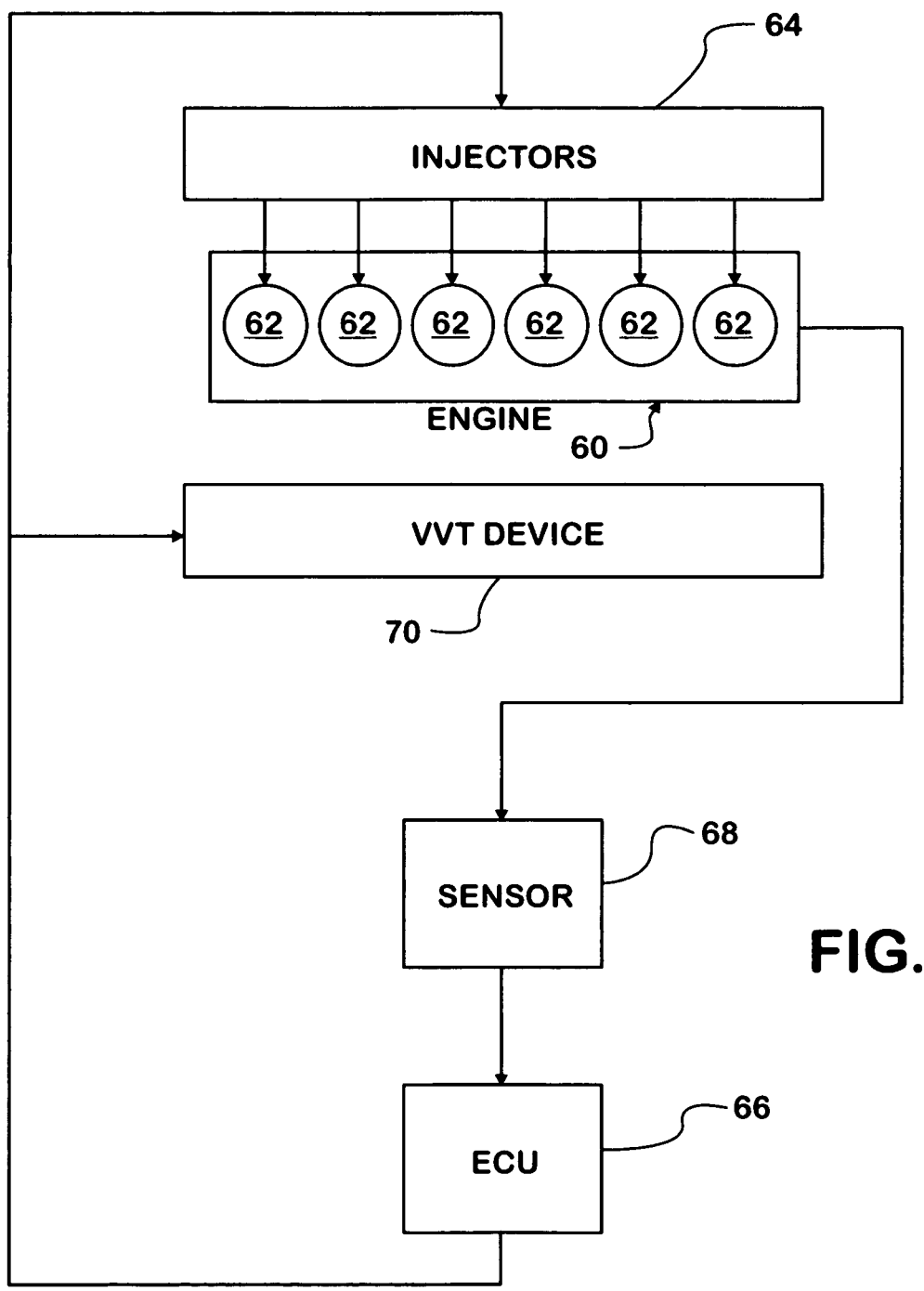
FIG. 2 is a general schematic diagram of portions of an exemplary diesel engine relevant to certain principles of the present invention.

FIG. 2 shows schematically a portion of an exemplary diesel engine 60 operating in accordance with the inventive strategy defined by FIG. 1 for powering a motor vehicle. Engine 60 comprises cylinders 62 within which pistons reciprocate. Each piston is coupled to a respective throw of a crankshaft by a corresponding connecting rod. Intake air is delivered to each cylinder through an intake system when a respective intake valve is open.

The engine has a fueling system that comprises fuel injectors 64 for the cylinders 62. The engine also has a processor-based engine control unit (ECU) 66 that processes data from various sources to develop various control data for controlling various aspects of engine operation. The data processed by ECU 66 may originate at external sources, such as various sensors 68, and/or be generated internally. Examples of data processed may include engine speed, intake manifold pressure, exhaust manifold pressure, fuel injection pressure, fueling quantity and timing, mass airflow, and accelerator pedal position.

ECU 66 controls the injection of fuel into cylinders 62 by controlling the operation of the fueling system, including controlling the operation of fuel injectors 64. The processing system embodied in ECU 66 can process data sufficiently fast to calculate, in real time, the timing and duration of device actuation to set both the timing and the amount of each injection of fuel into a cylinder. Such control capability is used to implement the inventive strategy.

Engine 60 also has a VVT system 70 that is controlled by ECU 66. The VVT system may be any of various known types such as a "camless" type. The VVT system is capable of changing the timing at which the intake valves for the cylinders operate and hence of changing the effective compression ratio of the engine cylinders, as will be more fully explained hereinafter.

Regardless of how data values for engine speed and engine load are developed, this particular embodiment of the invention uses instantaneous engine speed and instantaneous engine load to select the particular fueling mode for the engine, either 1) the HCCI+RVT mode for creating HCCI combustion, 2) the HCCI+VVT mode for creating HCCI combustion, or 3) the CD+RVT mode for creating CD combustion, and to then operate the fueling system to fuel the engine according to the strategy of the selected fueling mode. Alternately, only engine load may be used to select the particular mode.

Figure 3:
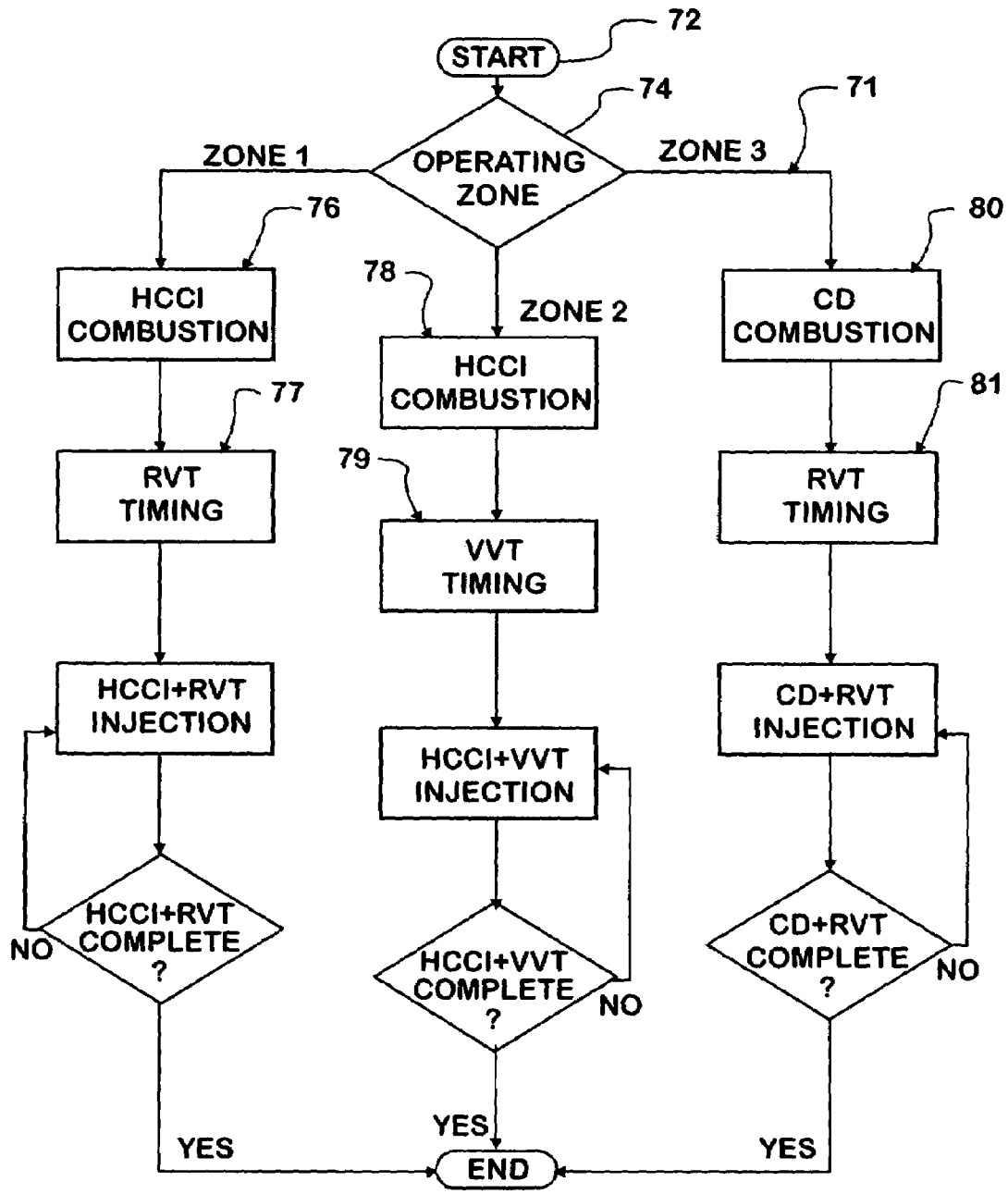
FIG. 3 is a flow diagram illustrating an embodiment of the inventive strategy utilized in the engine of FIG. 2.

FIG. 3 shows a flow diagram 71 for the inventive strategy as executed by the processing system of ECU 66. The reference numeral 72 represents the start of the processing executed by the strategy. A step 74 processes engine speed data and engine load data to determine which the three fueling modes of FIG. 1 is to be selected. One way of selecting the mode is by providing one or more maps in the processing system to define the three zones and comparing data values for instantaneous engine speed and engine load according to the maps.

When step 74 selects HCCI+RVT mode, FIG. 3 discloses that fuel will be injected into each cylinder to create HCCI combustion in all cylinders (reference numeral 76) with regular valve timing RVT (reference numeral 77). The operation continues until completed at which time the processing of the flow diagram iterates.

When step 74 selects HCCI+VVT mode, FIG. 3 discloses that fuel will be injected into each cylinder to create HCCI combustion in all cylinders (reference numeral 78) with intake valve timing being changed by variable valve timing system 70 (reference numeral 79). The operation continues until completed at which time the processing of the flow diagram iterates.

When step 74 selects CD+RVT mode, FIG. 3 discloses that fuel will be injected into each cylinder to create CD combustion in all cylinders (reference numeral 80) with regular valve timing RVT (reference numeral 81).

In the HCCI+RVT mode, fuel is injected to cause HCCI combustion using regular valve timing (RVT). FIG. 4A illustrates a generic example of fueling for the HCCI+RVT mode. The example is characterized by a zone 82 of relatively higher fuel injection pressure and relatively shorter fuel injection duration so that fuel enters the cylinders and mixes well with air before auto-ignition and the resulting products of combustion have low $NO_x$ and soot emissions.

In the HCCI+VVT mode, fuel is injected to cause HCCI combustion. By varying the effective compression ratio of the engine through the use of variable valve timing, HCCI can be accomplished at larger loads and higher speeds than in the HCCI+RVT mode. FIG. 4B illustrates a generic example of fueling for the HCCI+VVT mode. The example is characterized by a zone 84 where fuel injection pressure that is relatively higher than that of zone 82 to make more fuel enter the cylinders, as required by the increased load and/or higher speed in comparison to the HCCI+RVT mode, and mix well with air before auto-ignition. In the HCCI+VVT mode, VVT system 70 is operated to reduce the effective compression ratio from the compression ratio of RVT. That results in a decrease in cylinder pressure and a decrease in peak combustion temperature. Consequently, but depending on the particular engine load, the duration of fuel injection can be somewhat longer than that of zone 82. Therefore, the HCCI combustion range is expanded to encompass two zones in FIG. 1, with low $NO_x$ and soot emissions in both zones.

In the CD+RVT mode, the engine is fueled to cause CD combustion. FIG. 4C illustrates a generic example of fueling for the CD+RVT mode. The example shows a zone 86 that is characterized by relatively lower fuel injection pressure, advanced fuel injection timing, and longer fuel injection duration than either zone 82 or 84. In the CD+RVT mode, engine 60 can meet high speed and high load requirements, with the products of combustion containing typical $NO_x$ and soot emissions.

The following relation demonstrates how VVT can change effective compression ratio in a diesel engine. By definition, $$\text{Effective compression ratio} = \frac{\text{effective displacement} + \text{clearance volume}}{\text{clearance volume}}$$

where the clearance volume in a diesel engine is fixed.

When the intake valve timing is changed by VVT, the effective displacement of engine is varied, as shown below, $$V_{\mathit{eff\text{-}dis}} = \frac{\pi B^2}{4}\left(l + a - a\cos\theta - \sqrt{l^2 - a^2\sin^2\theta}\right)$$

where $V_{\mathit{eff\text{-}dis}}$ is the effective displacement of engine, B is the cylinder bore diameter, l is the connecting rod length, a is the crank radius, and $\theta$ is the intake valve close timing, i.e., the crank angle before TDC. It is obvious that retarding the intake valve close timing decreases the effective displacement of engine, and vice versa.

Delaying the timing of intake valve closing during the HCCI+VVT mode creates a lower effective compression ratio that allows fuel to be injected while in-cylinder pressure is sufficiently low to allow creation of a homogeneous charge that can subsequently ignite by HCCI combustion as the piston nears TDC, while increased fueling provides the additional energy input for the increased load and/or higher speed than during the HCCI+RVT mode. The delay in intake valve closing must however not be so long that the ratio of air to fuel becomes too low.

The engine control system typically contains multiple fueling maps correlated with various combinations of speed and load. In the HCCI+RVT zone of FIG. 1, the maps would be generally consistent with zone 82 of FIG. 4A. In the HCCI+VVT zone, the maps would be generally consistent with zone 84 of FIG. 4B. In the CD+RVT zone, the maps would be generally consistent with zone 86 of FIG. 4C.

When a cylinder is to be fueled for HCCI combustion in the HCCI+RVT mode, the processing system utilizes a corresponding fueling map that provides fueling parameters suited for causing fuel to be injected consistent with zone 82 for the particular engine speed and load.

When a cylinder is to be fueled for HCCI combustion in the HCCI+VVT mode, the processing system utilizes a corresponding fueling map or maps that provide fueling parameters suited for causing fuel to be injected consistent with zone 84 for the particular engine speed and load.

When a cylinder is to be fueled for CD combustion in the CD+RVT mode, the processing system utilizes a corresponding fueling map or maps that provide fueling parameters suited for with causing fuel to be injected consistent with zone 86 for the particular engine speed and load.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

HCCI fueling may comprise one or more individual pulses.

The invention has the following advantages:
1) It can concurrently reduce $NO_x$ and soot.
2) It has high thermal efficiency.
3) It can cover the whole operating range of an engine.
4) It can be used in heavy-duty, medium-duty, and light-duty diesel engines.
5) The invention can be implemented in the processor alone, provided that the processor has sufficient capacity, and this makes the invention quite cost-effective.

While a presently preferred embodiment of the invention has been illustrated and described, it should be appreciated that principles of the invention apply to all embodiments falling within the scope of the following claims.

What is claimed is:

1. A method of operating a compression ignition engine comprising:
   processing certain data to select one of plural fueling modes for operating the engine, and
   a) when the result of the processing selects a first fueling mode, fueling one or more combustion chambers to create a substantially homogeneous air-fuel charge within each such combustion chamber during a corresponding engine cycle and compressing each charge to auto-ignition without introducing any additional fuel after auto-ignition during that corresponding engine cycle,
   b) when the result of the processing selects a second fueling mode, reducing the effective compression ratio for each such combustion chamber from the effective compression ratio used during the first fueling mode, fueling each such combustion chamber to create a substantially homogeneous air-fuel charge within each such combustion chamber and compressing each charge to auto-ignition without introducing any additional fuel after auto-ignition during that corresponding engine cycle, and
   c) when the result of the processing selects a third fueling mode, fueling each such combustion chamber by introducing fuel at a time during the engine cycle when air in the corresponding combustion chamber has been compressed sufficiently to cause the fuel to combust as it is being introduced.

2. A method as set forth in claim 1 wherein the step of processing certain data to select one of plural fueling modes for operating the engine comprises
   processing data indicative of engine load.

3. A method as set forth in claim 2 wherein the step of processing certain data to select one of plural fueling modes for operating the engine comprises
   processing data indicative of engine speed.

4. A method as set forth in claim 1 wherein in a graph of engine speed vs. engine load whose origin corresponds to zero speed and zero load, step a) occurs at engine speeds and loads within a first zone of the graph that bounds the origin, step b) occurs at engine speeds and loads within a second zone that bounds the first zone, and step c) occurs at engine speeds and loads that bound the second zone.

5. A method as set forth in claim 1 wherein fuel is introduced into the combustion chambers by injection, and further including controlling the pressure at which fuel is injected such that the pressure during the first mode is less than that during the second mode but greater than that during the third mode.

6. A method as set forth in claim 5 further including controlling the duration of fuel injection such that the duration during the third mode is greater than that during the second mode, and the duration during the second mode is greater than that during the first mode.

7. A method as set forth in claim 6 further including controlling the timing of fuel injection such that the timing during the third mode is advanced relative to the timing in both the second mode and the first mode.

8. A method as set forth in claim 1 wherein during the second mode, the step of reducing the effective compression ratio for each such combustion chamber from the effective compression ratio used during the first mode comprises varying the timing of the operation of intake valves for such combustion chambers.

9. A compression ignition engine comprising:
   a control system for processing data;
   one or more combustion chambers; and
   a fueling system for injecting fuel into the one or more combustion chambers;
   wherein the control system controls the fueling system using a result of the processing of certain data by the control system to select one of plural fueling modes for operating the engine such that a) when the result of the processing selects a first fueling mode, one or more combustion chambers are fueled to create a substantially homogeneous air-fuel charge within each such combustion chamber during a corresponding engine cycle and each such charge is compressed to auto-ignition without the introduction of any additional fuel after auto-ignition during that corresponding engine cycle, b) when the result of the processing selects a second fueling mode, the effective compression ratio for each such combustion chamber is reduced from the effective compression ratio used during the first fueling mode, and each such combustion chamber is fueled to create within each such combustion chamber a substantially homogeneous air-fuel charge that is compressed to auto-ignition without the introduction of any additional fuel after auto-ignition during that corresponding engine cycle, and c) when the result of the processing selects a third fueling mode, each such combustion chamber is fueled by the introduction of fuel at a time during the engine cycle when air in the corresponding combustion chamber has been compressed sufficiently to cause the fuel to combust as it is being introduced.

10. An engine as set forth in claim 9 wherein the certain data comprises data indicative of engine load.

11. An engine as set forth in claim 10 wherein the certain data comprises data indicative of engine speed.

12. An engine as set forth in claim 9 wherein in a graph of engine speed vs. engine load whose origin corresponds to zero speed and zero load, the first fueling mode occurs at engine speeds and loads within a first zone of the graph that bounds the origin, the second fueling mode occurs at engine speeds and loads within a second zone that bounds the first zone, and the third fueling mode occurs at engine speeds and loads within a third zone that bounds the second zone.

13. An engine as set forth in claim 9 further including a fuel injection system that introduces fuel into the combustion chambers by injection, and wherein the control system controls the pressure at which fuel is injected such that the pressure during the first mode is less than that during the second mode but greater than that during the third mode.

14. An engine as set forth in claim 13 wherein the control system further controls the duration of fuel injection such that the duration during the third mode is greater than that during the second mode, and the duration during the second mode is greater than that during the first mode.

15. An engine as set forth in claim 14 wherein the control system further controls the timing of fuel injection such that the timing during the third mode is advanced relative to the timing in both the second mode and the first mode.

16. An engine as set forth in claim 9 further including a variable valve timing mechanism for controlling the timing of operation of intake valves for the combustion chambers, and wherein the control system further controls the variable valve timing mechanism such that during the second mode, the intake valves operate to cause the effective compression ratio for each such combustion chamber to be less than the effective compression ratio used during the first mode.

17. A method of operating a compression ignition engine to extend the load/speed range over which HCCI combustion occurs, the method comprising:
a) over a relatively lower speed/load range, fueling one or more combustion chambers to create a substantially homogeneous air-fuel charge within each such combustion chamber during a corresponding engine cycle and compressing each charge to auto-ignition without introducing any additional fuel after auto-ignition during that corresponding engine cycle, and
b) over a relatively higher speed/load range, decreasing the effective compression ratio of each such combustion chamber and fueling each such combustion chamber with increased fueling to create a substantially homogeneous air-fuel charge within each such combustion chamber during a corresponding engine cycle and compressing each charge to auto-ignition without introducing any additional fuel after auto-ignition during that corresponding engine cycle.

18. A method as set forth in claim 17 wherein the effective compression ratio is reduced by operating a variable valve timing mechanism to delay the time of intake valve closing.

19. A compression ignition engine comprising:
a control system for processing data;
one or more combustion chambers; and
a fueling system for injecting fuel into the one or more combustion chambers;
wherein the control system controls the fueling system to extend the load/speed range over which HCCI combustion occurs by
a) fueling one or more combustion chambers over a relatively lower speed/load range to create a substantially homogeneous air-fuel charge within each such combustion chamber during a corresponding engine cycle and compressing each charge to auto-ignition without introducing any additional fuel after auto-ignition during that corresponding engine cycle, and
b) decreasing the effective compression ratio of each such combustion chamber and fueling each such combustion chamber with increased fueling over a relatively higher speed/load range to create a substantially homogeneous air-fuel charge within each such combustion chamber during a corresponding engine cycle and compressing each charge to auto-ignition without introducing any additional fuel after auto-ignition during that corresponding engine cycle.

20. An engine as set forth in claim 19 further including a variable valve timing mechanism for controlling the timing of operation of intake valves for the combustion chambers, and wherein the control system further controls the variable valve timing mechanism to decrease the effective compression ratio for each such combustion chamber by delaying the time of intake valve closing.

* * * * *